United States Patent [19]
Henrion

[11] Patent Number: 5,323,395
[45] Date of Patent: Jun. 21, 1994

[54] METHOD AND SYSTEM FOR SENDING DATA OVER A TRANSMISSION LINK IN VARIABLE LENGTH BLOCKS IN ASYNCHRONOUS TRANSFER MODE

[75] Inventor: Michel Henrion, Brussels, Belgium

[73] Assignee: Alcatel N.V., Amsterdam, Netherlands

[21] Appl. No.: 992,935

[22] Filed: Dec. 18, 1992

[30] Foreign Application Priority Data

Dec. 18, 1991 [FR] France .................. 91 15747

[51] Int. Cl.⁵ ............................................ H04L 12/56
[52] U.S. Cl. ................................. 370/94.1; 370/79
[58] Field of Search ............... 370/94.1, 60, 110.1, 370/79

[56] References Cited

U.S. PATENT DOCUMENTS 4,984,264  1/1991  Katsube ........................... 370/54
5,003,535  3/1991  May, Jr. ........................ 370/94.1

FOREIGN PATENT DOCUMENTS

0301934  2/1989  European Pat. Off. .
0354120  2/1990  European Pat. Off. .
0446540  9/1991  European Pat. Off. .
91/02420  2/1991  PCT Int'l Appl. .

Primary Examiner—Douglas W. Olms
Assistant Examiner—Min Jung
Attorney, Agent, or Firm—Robbins, Berliner & Carson

[57] ABSTRACT

Data is sent over a transmission link in consecutive variable length blocks in asynchronous transfer mode. Each block is either a data block if it contains data or an empty block if it does not. Each data block includes a header sub-block of a first type containing service data and at least one data sub-block of a second type containing data. Each empty block includes an empty sub-block of a third type. The sub-blocks of one of the three sub-block types have a length different from the respective lengths of the sub-blocks of the other two types.

9 Claims, 4 Drawing Sheets

METHOD AND SYSTEM FOR SENDING DATA OVER A TRANSMISSION LINK IN VARIABLE LENGTH BLOCKS IN ASYNCHRONOUS TRANSFER MODE

BACKGROUND OF THE INVENTION

1. Field of the Invention

The present invention concerns a method and system for sending data over a transmission link in variable length blocks in asynchronous transfer mode.

2. Description of the Prior Art

Conventional asynchronous transfer mode (ATM) transmission over an ATM transmission link is a digital transmission process in which data is sent in the form of cells. These cells are groups of consecutive bits and include header bits and data bits. The header bits of a cell carry data internal to the ATM transmission network providing the ATM transmission links, for example data identifying the destination of the cell. The data bits convey data sent over the ATM transmission network on behalf of external terminal equipments connected to the network.

One characteristic of ATM transmission is that cells are sent over a transmission link in a continuous uninterrupted sequence. Because of this, when there is no data to be sent an ATM transmission link conveys so-called "empty" cells, that is to say cells containing no user data but containing standardized and readily recognizable service data.

A full description of ATM transmission will be found, for example, in "Asynchronous Transfer Mode" by Martin de Prycker published by Ellis Horwood in 1991 or in the relevant CCITT recommendations.

At present ATM transmission is based on cells which are all the same length and each comprise a header and a data field. Consideration has been given to including in the header control bits, for example bits representing a cyclic redundancy check (CRC) calculation. A calculation of this kind can apply to part only or to all of the header. A typical example of fixed length cells is provided by ATM transmission using 53-byte cells in which each cell comprises a header on five bytes and a data field of 48 bytes.

Consideration has also been given to sending variable length cells in an enhanced transmission process departing from ATM transmission as just defined. Reference may usefully be made to patent applications PCT/EP89/00942 (which corresponds to commonly assigned U.S. application Ser. No. 07/565,310) and EP-90401393.5 (which corresponds to commonly assigned U.S. application Ser. No. 07/776,337). These variable length cells are made up of sub-cells having the same fixed length. The transmission links then carry variable length cells made up of fixed length sub-cells and empty cells. A variable length cell comprises at least one header sub-cell and one or more data sub-cells. An empty cell is the same length as or comprises a sub-cell used for the variable length cells.

Thus in the documents mentioned the sub-cells transmitted are all the same length.

The invention is directed to further enhancement of transmission efficiency as compared with the enhanced transmission method mentioned above.

It relates to a process and a system which differ from ATM transmission so that it has been deemed desirable to make a distinction by using the terms "block" and "sub-block" rather than "cell" and "sub-cell" to denote send data units which are similar to the usual ATM units in many respects but different in others, as will be explained later.

The invention therefore starts from a transmission method using variable length blocks each comprising a header sub-block and one or more data sub-blocks and empty blocks each made up of an empty sub-block, that is three different types of sub-block, in the manner of the method previously described.

It is based on the observation that the conditions determining the optimum length of the sub-blocks of a particular type are not the same as those determining the optimum length of the sub-blocks of another type and that as a consequence of this the optimum lengths of the two types of sub-block are not the same, except where this is coincidental.

SUMMARY OF THE INVENTION

In one aspect the invention consists in a method of sending data over a transmission link in variable length blocks in asynchronous transfer mode, blocks being sent over the transmission link consecutively and each block being either a data block if it contains data or an empty block if it does not, each data block comprising a header sub-block of a first type containing service data and at least one data sub-block of a second type containing data and each empty block comprising an empty sub-block of a third type, in which method the sub-blocks of one of the three sub-block types have a length different from the respective lengths of the sub-blocks of the other two types.

Generally speaking, this means that the sub-blocks of each of the three types can have an optimum length.

The invention further provides that said different length may be modifiable, that is to say parameterable.

In this way the same transmission system installed under certain conditions will use sub-blocks with lengths adapted to those conditions so that it can operate optimally and then, if the conditions change, the lengths of the sub-blocks can be modified appropriately so that operation continues under optimum conditions.

In this transmission method the sub-blocks of each of the sub-block types contain a sub-block type identifier to make it possible at the receiving end to identify the type to which a received sub-block belongs and therefore its length.

The length of each sub-block is needed to synchronize the sub-blocks and to verify this synchronization. This aspect of the transmission method of the invention is described in French patent application No 91 15748 a copy of which is contained in the file wrapper of the present application which is directed to an asynchronous transfer mode variable length data block transmission link synchronization method.

The identifier is advantageously at least in part implicit, given that the type of the preceding sub-block is known and, at least in part, conditions the type of the sub-block in question.

In a second aspect the invention consists in a device for sending data in variable length blocks in asynchronous transfer mode, blocks being sent over a transmission link consecutively and each block being either a data block if it contains data or an empty block if it does not, each data block comprising a header sub-block of a first type containing service data and at least one data sub-block of a second type containing data and each empty block comprising an empty sub-block of a third type, which device comprises at the send and receive ends of said transmission link means for defining in a modifiable manner the respective lengths of the sub-blocks of each sub-block type.

The advantages of the present invention will emerge more clearly from the following description given by way of example only and with reference to the appended drawings.

DETAILED DESCRIPTION OF THE INVENTION

Figure 1:
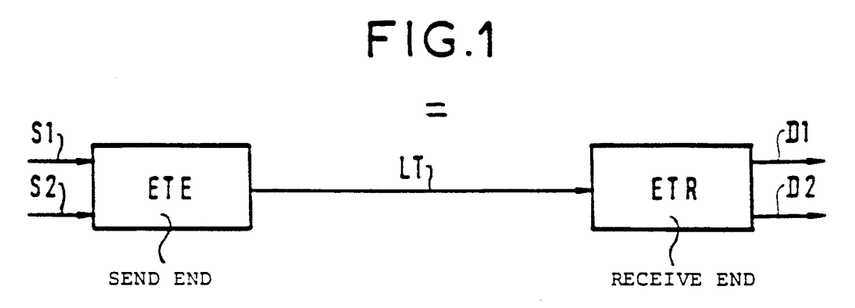
FIG. 1 shows a transmission system in which the present invention may be applied.

FIG. 1 shows a transmission system in which the present invention may be applied. This system comprises a transmission link LT conveying from a send end ETE to a receive end ETR electromagnetic or possibly optical signals which can on command assume at least two states to characterize digital data.

Data to be sent is communicated to the send end by one or more data sources; sources S1 and S2 are shown. The data received at the receiving end ETR is supplied to one or more data destinations; destinations D1 and D2 are shown.

The mode of transmission between the data sources and the send end ETE is not part of the invention. The data to be sent acquired by the send end ETE is arranged at the send end ETE in conformance with the method of the invention (unless this has been done already) for sending over the transmission link LT to the receive end ETR whence it is supplied to its destinations in a transmission mode, the same as the former mode or otherwise, which is also not part of the invention.

Figure 2:
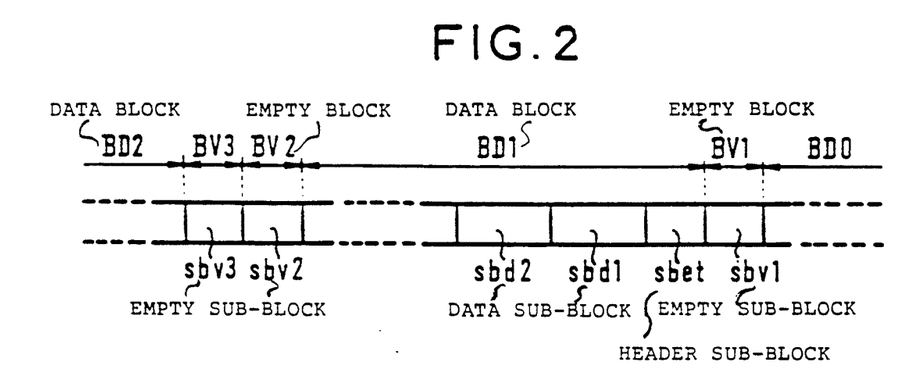
FIG. 2 shows the data sent in the FIG. 1 system.

The invention concerns the mode of transmission between the send end ETE and the receive end ETR whereby, using a known technique, the data is sent over the transmission link LT in variable length blocks in asynchronous transfer mode, the blocks being sent over the transmission link consecutively and each block either containing data (data block) or being empty (empty block). Each data block comprises a header sub-block of a first type containing service data and at least one data sub-block, each empty data block comprising an empty sub-block of a third type. FIG. 2 shows this transmission mode. It shows from right to left a data block BD0 at the end of transmission, an empty block BV1, a data block BD1, two empty blocks BV2 and BV3 and the start of a data block BD2.

In this example all the empty blocks are identical and each comprises a respective empty sub-block sbv1, sbv2, sbv3. A variable length block comprises at least one header sub-block and one or more data sub-blocks.

Empty blocks are sent if there are no data blocks to be sent so that the transmission process is continuous, enabling synchronization of the receiving end to the sending end to be maintained at all times at elementary signal level, i.e. at bit level.

They are therefore all the same length expressed as a certain number of elementary signals (bits, for example).

The data blocks like block BD1 all comprise a header sub-block sbet followed by a variable number of data sub-blocks sbd1, sbd2, etc. The header sub-blocks of the various data blocks are all the same length. The data sub-blocks of the data blocks are all the same length.

The transmission of variable length blocks is intended to enhance transmission efficiency, i.e. the ratio of the volume of user data conveyed to the total volume of data actually sent.

Each data block comprises a header containing service data used for routing and checking the data block; the presence of this header in each data block reduces the efficiency of the transmission link in proportion to the size of the data block. This means that the data blocks must be long. However, the data to be sent is not normally segmented in conformance with the data block length. The data blocks will therefore be filled inefficiently and the loss of transmission efficiency will increase in proportion to the data block length. This means that the data blocks must be short.

Increasing the length of the data blocks comes up against technical constraints in the equipment processing the data blocks: long blocks cannot in practise be processed in a parallel form of representation and must therefore be processed serially, which introduces processing time constraints; secondly, temporary storage of long data blocks requires buffers of commensurately greater capacity. This is another reason why the data blocks must be short.

The transmission by means of variable length data cells structured into sub-cells as described in the two prior art documents cited above constitutes one response to these conflicting requirements.

In the prior art examples using variable length data blocks all the sub-blocks are the same length. This might seem justified for reasons of simplicity in the processing of sub-blocks all having the same length and in the sub-division into sub-blocks of the data received at the receiving end.

The invention starts from the observation that it may not always be optimal, in terms of transmission efficiency, to send sub-blocks which are all the same length; it proposes a method and a device for sending data over a transmission link in variable length blocks as defined above in which the sub-blocks of one type at least have a length different from the respective lengths of the sub-blocks of the other two types.

For example, in the transmission mode shown in FIG. 2 the empty sub-blocks are shorter than the data sub-blocks. Assuming that the length of the data sub-blocks is fixed by technical considerations in respect of the equipment processing the data of the sub-blocks at a relatively high value whereas the length of the empty sub-blocks as determined by the requirements for routing of service data is relatively short, the invention makes it possible to reduce the length of the empty sub-blocks, for example.

As the conditions mentioned above which determine the respective optimal length of the sub-blocks of each type are essentially circumstantial and will obviously change with time, the invention further provides for said different length to modifiable, that is to say parameterable.

Generally speaking, the invention consists in providing sub-blocks of each of the identified three types having a parameterable length determined independently of those of the sub-blocks of the other types. All combinations of sub-block lengths are feasible a priori.

Considering the relative sub-block lengths and three sub-block types which have three respective different lengths, it is seen that there are six cases to be taken into consideration, from that in which the empty, header and data sub-blocks have respective increasing lengths to that in which they have respective decreasing lengths, through all intermediate cases.

Six other cases emerge on assuming that two types of sub-block have the same length and that the third is either shorter or longer. In the current state of the art the first case envisaged was that which had to be adopted, although other cases could prove desirable at a later stage following technological advances.

The benefit of the invention is that it provides not only for the present situation by adopting different sub-block lengths but also for the future by adopting parameterable sub-block lengths.

Implementing the invention entails modifying and enhancing various functions and units of known type asynchronous data block transmission systems. It is important firstly that the clock which counts the sub-blocks is able to handle the different lengths of the sub-block types. Secondly, the data block send and receive circuits must operate at the clock rate of the consecutive sub-block type lengths.

Finally, the input and output ports must also cater for the different sizes of the different sub-block types sent.

To implement the invention an indication of the type of sub-block to be received or sent is provided in the send and receive units.

By virtue of this indication it is possible to provide a sub-block clock comprising a counter able to count a different number of bits or bytes according to the sub-block type indication. This provides a sub-block clock able to generate sub-block send and receive control signals. This indication of the type of sub-block to receive or send enables the sub-block send and receive circuits to operate correctly.

Figure 3:
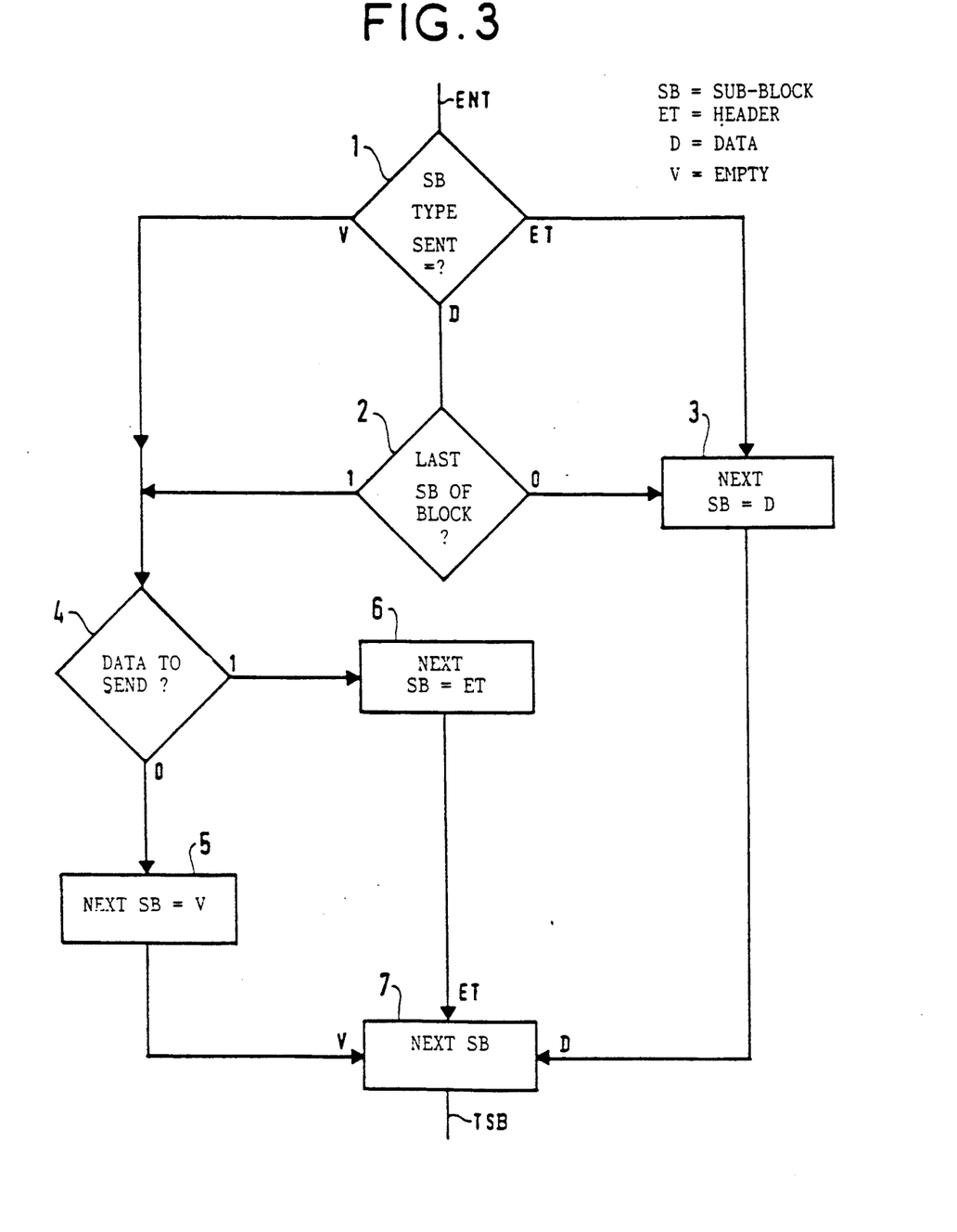
FIG. 3 shows a flowchart used during transmission in a device implementing the method in accordance with the invention.
Figure 4:
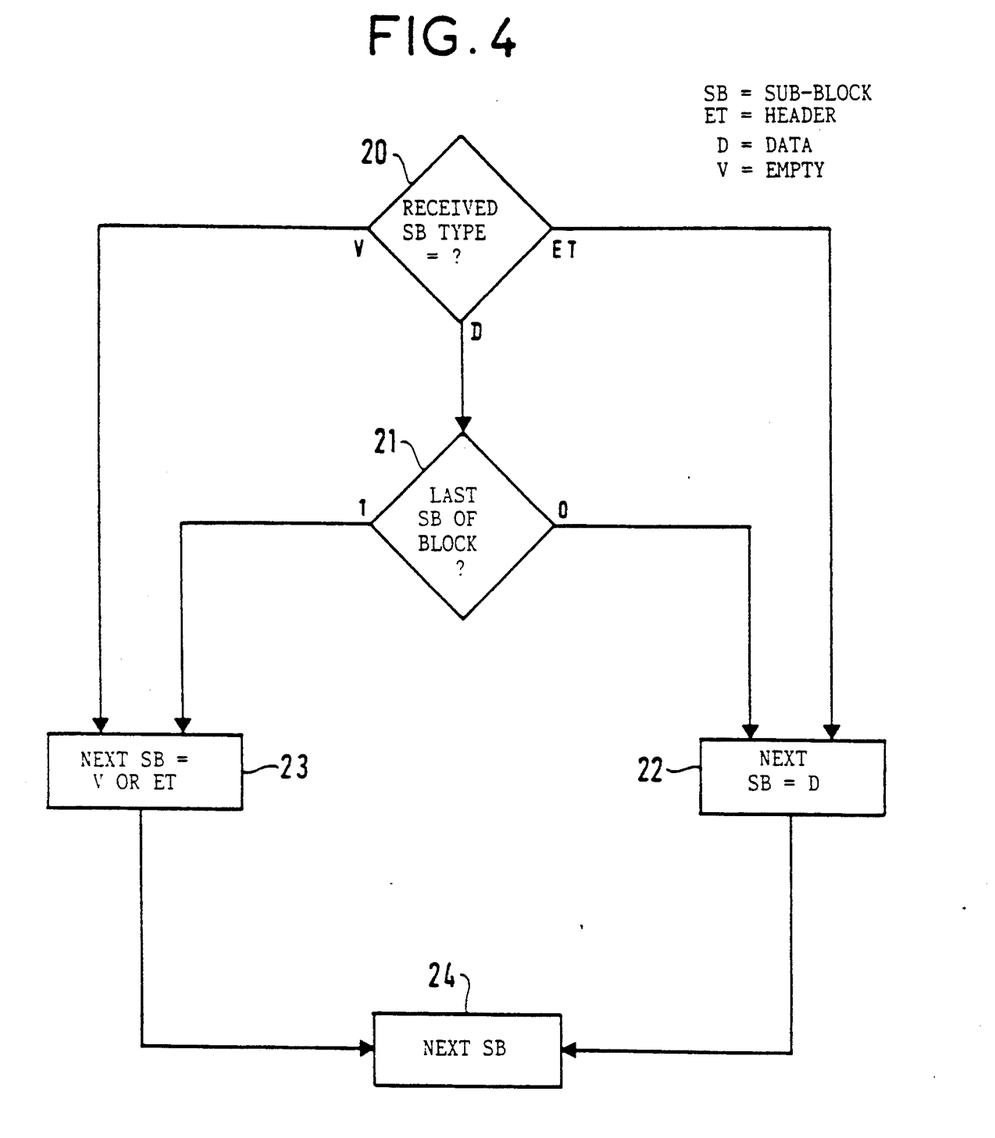
FIG. 4 shows a flowchart used during reception in a device implementing the method in accordance with the invention.

FIG. 3 shows a flowchart used for sending data. This flowchart is used to determine the type of the next sub-block to send after the sub-block currently being sent. The result of the calculation carried out using this flowchart is used to update a sub-block type indication. Like that of FIG. 4, the flowchart of FIG. 3 concerns the situation in which the variable length blocks are made up of a first header sub-block followed by a variable number of data sub-blocks, the empty blocks each comprising an empty sub-block. Furthermore, a process of delineating data blocks which does not form any part of the present invention indicates whether a receive data sub-block is the last one of a data block or not. This process will conform to one of the following three approaches, for example:

- an explicit indication is included in the last data sub-block, which amounts to characterizing a fourth data sub-block type ("last data sub-block") different than the others; or
- an explicit block length indication is included in the header sub-block (or in the first data sub-block), expressed (for example) as a number of data sub-blocks in the block, the last sub-block being identified by counting; or
- an implicit determination is carried out a posteriori, i.e. only on receiving the next sub-block (after the last data sub-block of a block not yet recognized as such), because the reception of a header sub-block or of an empty sub-block after a data sub-block means that the latter was the last data block (previously) being received.

In the transmission systems of the two prior art documents cited above an empty sub-block is followed either by another empty sub-block or by the first sub-block of a variable length data block, which is a header sub-block. A header sub-block of a variable length block is followed by a data sub-block. Finally, a data sub-block is followed by another data sub-block if it is not the last data sub-block of a variable length block. If it is the last data sub-block of a variable length block said variable length block is followed either by an empty block or by another variable length block. Because of this the last data sub-block of a variable length block is followed either by an empty sub-block or by a header sub-block of a variable length block.

Step 1 of the FIG. 3 flowchart determines the currently sent sub-block type from the type indication. If this is a header sub-block, go to step 3. If it is a data sub-block, go to step 2. If it is an empty sub-block, go to step 4.

Step 4 determines if the data sub-block is the last one of the variable length block being sent. If it is, go to step 4, if not, go to step 3.

At step 3 it is known that it is necessary to send another data sub-block. The type of sub-block to send indication is therefore updated to show that the next sub-block to send is a data sub-block; then go to step 7.

Step 4 determines if a variable length block is ready to be sent or if an empty block must be sent. If a variable length block must be sent, go to step 6. If an empty block must be sent, go to step 5.

Step 5 updates the type of sub-block to send indication to show that the next sub-block to send is a sub-block constituting an empty block; then go to step 7.

Step 6 updates the type of sub-block to send indication to show that the next sub-block to send is a header sub-block of a variable length block; then go to step 7.

At step 7 the sub-block type indication has been updated and the send subsystem therefore knows the length of the next sub-block to send.

Thus using the FIG. 3 flowchart the send subsystem of a transmission unit implementing the process in accordance with the invention is able to determine the type of sub-blocks to send. This flowchart is used by the send subsystem each time that a sub-block is sent. It requests from a data source the indication that there remains at least one other sub-block to send in the block being sent and the indication that another data block must follow the data block sending of which is ending.

FIG. 4 shows a flowchart used at the receiving end to determine in a similar manner which type of sub-block is to be received after the sub-block currently being received. The first step 20 of this flowchart determines the type of sub-block currently being received. If this is a header sub-block, go to step 22, if it is a data sub-block, go to step 21 and if it is an empty sub-block, go to step 23.

Step 21 determines if the data sub-block currently being received is the last data sub-block of the variable length sub-block which contains it.

This is possible, for example, by virtue of a variable length data block delineation process as mentioned above. Another solution is for the data sub-block to provide this indication itself. If the sub-block currently being received is the last data sub-block of a variable length block, go to step 23. On the other hand, if the sub-block currently being received is not the last data sub-block of a variable length block, go to step 22.

At step 22 is it known that the next sub-block received will be a data sub-block. The sub-block type indication is therefore updated to show that the next sub-block received will be a data sub-block; then go to step 24 on which this data is output.

At step 23 it is known that the next sub-block received will be either a header sub-block or an empty sub-block. The sub-block type indication is updated to show that the next sub-block to be received will be either a header sub-block or an empty sub-block; then go to step 24.

At step 24 the type of sub-block to be received indication has been updated and the receive subsystem of the transmission unit knows that the next sub-block to be received is definitely a data sub-block or either an empty sub-block or a header sub-block, which will be decided according to the content of the next sub-block. Remember that an empty sub-block is easily recognizable and that a header sub-block can therefore be recognized by default. The sub-block type indication is then implicit.

It is also possible to distinguish between a header sub-block and an empty sub-block by means of an appropriate indicator (such as a bit meaning "header" or "empty") in each header or empty sub-block and processed during reception of the sub-block. It is then only partially implicit.

Figure 5:
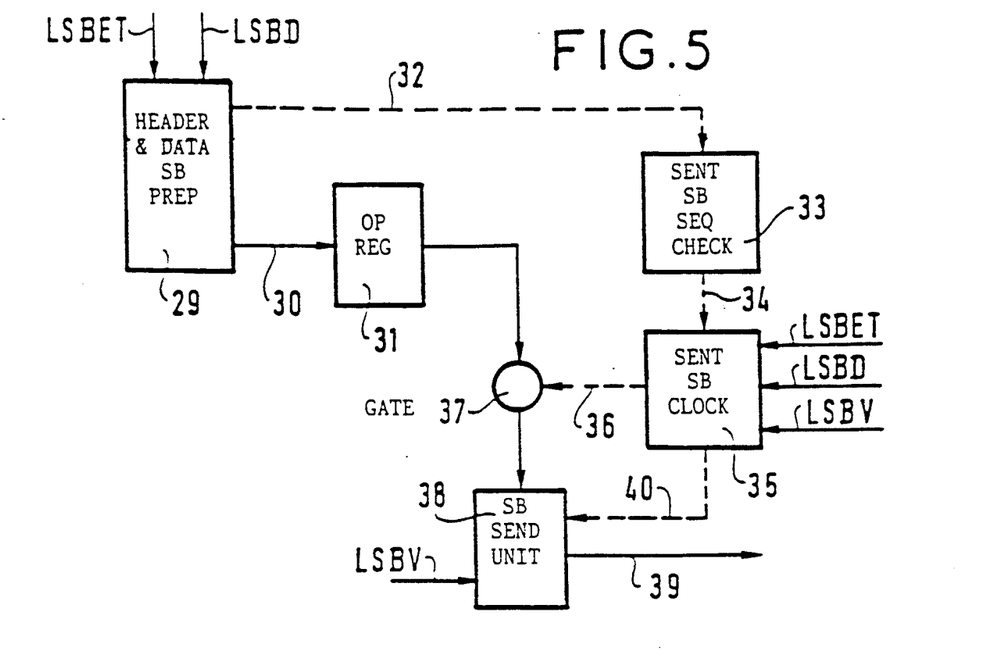
FIG. 5 is a block diagram of a send unit of a device implementing the method in accordance with the invention.

FIG. 5 is a block diagram of a send subsystem of a device implementing the invention. FIG. 5 is given by way of example only.

In FIG. 5, the unit 29 represents the part of the send subsystem which manages and formats the variable length blocks to be sent, i.e. which prepares the header sub-blocks and the corresponding data sub-blocks. The structure of the unit 29 will be apparent to the man skilled in the art and is not described in further detail here.

Note however that this unit 29 receives from any selectively operable source parameters LSBET and LSBD specifying the respective lengths of the header sub-blocks and data sub-blocks.

Sub-blocks constructed by the unit 29 according to the above parameters are fed from its output 30 to an output register 31. The unit 29 produces at its output 32 a signal indicating if a new variable length block must be sent and if the sub-block currently being sent is the last one of a data block or not. This signal indicating the presence of successive data blocks is sent to a sent sub-block sequence checking circuit 33. The circuit 33 supplies to a sent sub-block clock 35 a signal 34 indicating the type of sub-block to send. This signal 34 is produced by the circuit 3 from the signal 32 using the FIG. 3 flowchart. The unit 35 sends a data block sub-block send control signal 36 to a gate 37. This gate 37 is connected to the output of the register 31 and passes data block sub-blocks at a clock rate controlled by the control signal 36. These sub-blocks are sent to a sub-block send unit 38 which comprises a parallel input/serial output register whose serial output is sent over the transmission link. The unit 38 also generates empty sub-blocks to be sent on the instruction of the signal 40 generated by the clock 35. To this end the sub-block send unit 38 receives an empty sub-block length parameter LSBV supplied an appropriate source which may be the same as that supplying the parameters LSBET and LSBD already mentioned.

The send subsystem shown in FIG. 5 operates as follows: if no variable length block must be sent in the unit 29, the signal 32 indicates that no variable length block must be sent and the sub-block sequence control unit 23 produces a signal 34 indicating that an empty sub-block must be sent after the last sub-block of the current data block, if there is one. The sub-block clock 35 therefore counts a number of bits or bytes representing the size of an empty sub-block, disables the signal 36 and activates the control signal 40 so as to send the order to send an empty block generated by the unit 35. In this way the send unit from FIG. 5 sends bits constituting an empty block over the link 39. Alternatively, the bits constituting the empty block may be stored in the output register 31 or provided by the unit 29.

If a variable length block must be sent the unit 29 supplies a signal 32 indicating that a block must be sent.

The unit 29 supplies to the gate 30 the first bits of the first sub-block of the variable length block. The circuit 33 which checks the sequence of sub-blocks receives the signal 32 and using the flowchart of FIG. 3 tells the clock 35 the type of sub-block to be sent. The clock 35 is therefore able to count the number of bits or bytes representing the size of the sub-block and activate the respective control signals 36. When a variable length block is being sent the circuit 33 for checking the sequence of sub-blocks is advised by the signal 32 of transfer of the last sub-block of the data block.

The unit 33 checking the sequence of sub-blocks can therefore use the FIG. 3 flowchart and in particular step 2 of this flowchart to determine if a data sub-block currently being transferred is the last sub-block of a variable length block. By virtue of the signal 32 the unit 33 knows if another variable length block must be sent, which enables it to respond to the question embodied in step 4 of the FIG. 3 flowchart.

The sub-block clock 35 must be capable of providing control signals 36 and 45 allowing for the size of the various sub-block types. Different size sub-blocks can be counted because a basic clock is set to the frequency with which bits are sent over the link 39 or to a submultiple of this frequency, for example the frequency at which groups of eight bits are sent.

This basic clock produces a signal which triggers a counter. This counter is initialized to a value dependent on the type of sub-block to be sent, as shown by the signal 34. This is why the clock 35 also receives the parameters LSBET, LSBD and LSBV already mentioned. Assuming that the basic clock counts bytes, if the signal 34 indicates that an empty sub-block must be sent the counter is initialized to the number of bytes in an empty sub-block. If the signal 34 indicates that a header sub-block must be sent the counter is initialized to the number of bytes in a header sub-block. If the signal 34 indicates that a data sub-block must be sent the counter is initialized to the number of bytes in a data sub-block. The sub-block clock 35 is therefore able to count different size sub-blocks, to send appropriate control signals 36 and 40 and to indicate to the other units the boundaries of the sub-blocks sent.

The process in accordance with the invention can therefore be implemented using the device shown by way of example in FIG. 5. The structure of the units and registers 31, 37 and 38, well known to the man skilled in the art, is not described in further detail.

Figure 6:
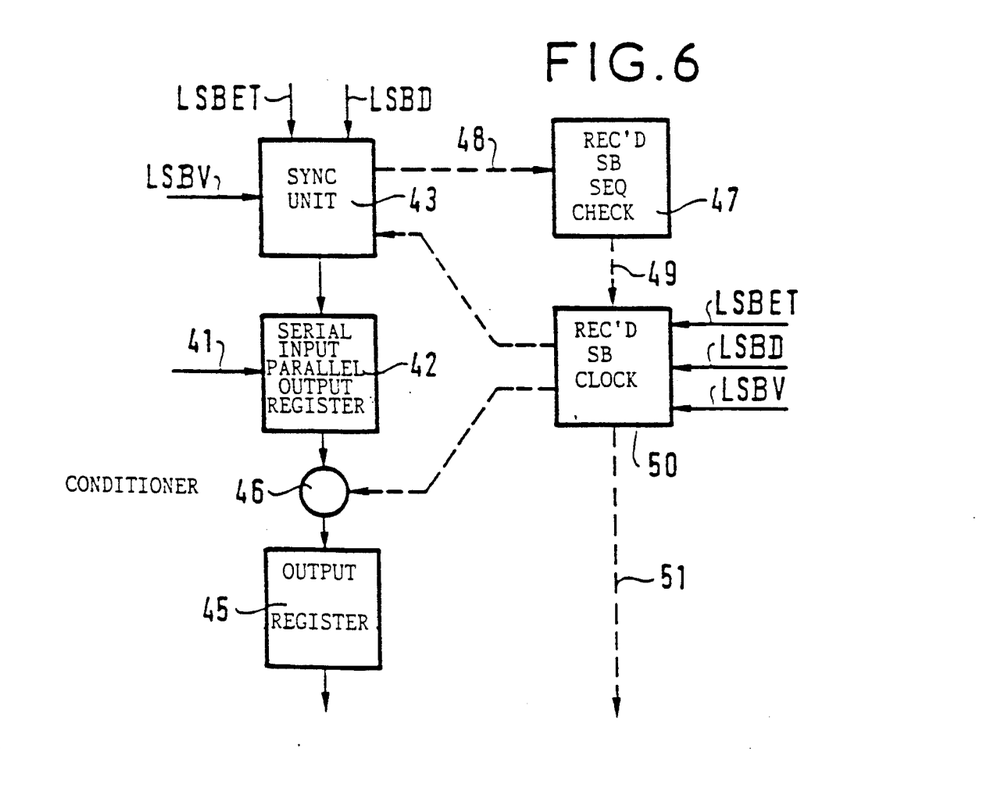
FIG. 6 is a block diagram of a receive unit of a device implementing the method in accordance with the invention.

FIG. 6 is a block diagram of a receive subsystem of a device implementing the invention. FIG. 6 is given by way of example only. The bits arrive over a link 41 and are received by a serial input/parallel output register 42. The parallel output of the register 42 is connected to a synchronization unit 43. This parallel output is also connected to an output register 45 by a conditioner 46. The synchronization unit 43 supplies to a received sub-block sequence checking circuit 47 a signal 48. This signal 48 indicates the type of sub-block received and the presence or absence of the last sub-block of a received data block. The circuit 47 provides a signal 49 indicating the type of sub-block to be received after the sub-block currently being received. This signal 49 is supplied to the synchronization unit 43 and to a received sub-block clock 50. This clock 50 supplies control signals to the device 46 and to the unit 43 and a received data block indication 51. Depending on these control signals, the device 46 passes the data or blocks it.

The synchronization unit 43 uses the synchronization process described in French patent application No 91 15748. It is able to distinguish an empty sub-block from a header sub-block by means of the indicator that these two sub-block types contain.

The circuit 47 uses the FIG. 4 flowchart.

To this end it receives the signal 48 from the unit 43 which tells it the type of sub-block received and, where appropriate, the presence of the last sub-block of a data block, which enables step 2 of the FIG. 4 flowchart to determine if a data sub-block is the last data sub-block of a variable length block or not. In this way the unit 47 can determine using the FIG. 4 flowchart if the next sub-block to be received is a data sub-block or if it is a header or an empty sub-block. This information is sent by the signal 49 to the sub-block clock 50. The clock 50 is analogous to the clock 35 described with reference to FIG. 5 and can count the sub-blocks supplied to it by the signal 49, according to the sub-block type indications. The synchronization unit 43 and clock 50 receive the parameters LSBET, LSBD and LSBV mentioned previously in order to fulfil their respective functions.

If the sub-block to be received is a header sub-block or an empty sub-block the signal 49 is not sufficient to determine the exact sub-block type. This is not known until the sub-block is received at which time an empty sub-block is distinguished from a header sub-block by the previously mentioned indicator. The header or empty sub-block type is then sent to the clock 50. In this way the clock 50 can count the bits or bytes of the sub-blocks and send control signals to the device 46, the synchronization unit 49 and the output 51 at the appropriate times.

The unit 43 implements the synchronization process described in French patent application No 91 15748. Synchronization is verified at least once per data block, for example on the header sub-blocks and the empty sub-blocks, using an indication characteristic of synchronization present in the sub-block, such as a cyclic redundancy check (CRC) character. If the header and empty sub-blocks are the same length it is possible to use the same algorithm for the CRC calculations. In this case the CRC calculated must apply to all of the data of the sub-blocks. On the other hand, if the header and empty sub-blocks are two different lengths, two solutions are possible. One is to use two different algorithms, that is to say one algorithm for each sub-block size. In this case the CRC calculation may apply to all of the data of the sub-blocks. Secondly, it is possible to use a single algorithm and in this case the CRC calculation applies, for example, to all of the data of the shortest type of sub-block and to part only of the data of the longest type of sub-block. The remainder of the data of these sub-blocks may be protected in some other way or not protected at all.

The exact location of successive indications characterizing synchronization by means of which the unit 43 supervizes correct synchronization of the link is determined by the unit 43 using relative positioning indications associated with the indications characteristic of synchronization according to the synchronization process described in French patent application No 91 15748 and received sub-block checking signals supplied by the clock 50 to the synchronization unit 43.

The above description assumes three sub-block types, which is the usual case.

It is obviously possible for the three sub-block types to have only two different lengths. The empty sub-blocks and the header sub-blocks may be the same length, for example.

Of course, the present invention is not limited to the embodiments described and shown but is open to variation by the man skilled in the art without departing from the scope of the invention.

There is claimed:

1. Method of sending data over a transmission link in variable length blocks in asynchronous transfer mode, comprising the steps:

sending consecutive blocks over the transmission link;

characterizing each block as either a data block if it contains data or an empty block if it does not;

transmitting each data block in the form of a header sub-block of a first type having a first predetermined length and containing service data and at least one data sub-block of a second type having a second predetermined length and containing data; and transmitting each empty block in the form of an empty sub-block of a third type having a third predetermined length;

wherein at least one of said first, second and third predetermined lengths is a different length not equal to at least one other of said predetermined lengths.

2. Method according to claim 1 further comprising the step of:

modifying said different length.

3. Method according to claim 1 further comprising the step of:

providing a sub-block type indication in the sub-blocks of each of said sub-block types to identify the sub-block type to which they belong.

4. Method according to claim 3 wherein said sub-block type indication associated with at least one of said sub-block types is dependent on a sub-block type to which a preceding sub-block belongs.

5. Method according to claim 1 further comprising the step of:

including at least one indication characteristic of synchronization in each data block for purposes of block synchronization.

6. Method according to claim 5 wherein a first said indication characteristic of synchronization is associated with a relative position indication defining the location of a subsequent said indication characteristic of synchronization.

7. Device for sending data in variable length blocks in asynchronous transfer mode, comprising:
- means for consecutively sending the blocks over a transmission link from a send end to a receive end, each block being either a data bock if it contains data or an empty block if it does not, each data block comprising a header sub-block of a first type containing service data and at least one data sub-block of a second type containing data, each empty block comprising an empty sub-block of a third type; and
- at the send and receive ends of each said transmission link, means for defining in a modifiable manner the respective lengths of the sub-blocks of each of the three sub-block types.

8. Device according to claim 7 further comprising:
- at the send end of the transmission link, sent sub-block sequence checking means responsive to an indication of the sub-block type currently being sent, to whether the current sub-block is the end of a data block, and to the presence or absence of a new data block to be sent, for determining the next sub-block type to be sent.

9. Device according to claim 7 further comprising:
- at the receive end of said transmission link received sub-block sequence checking means responsive to an indication of the sub-block type currently being received, for determining the next sub-block type to be received.

* * * * *